US008868891B2

(12) United States Patent
Chen et al.

(10) Patent No.: US 8,868,891 B2
(45) Date of Patent: *Oct. 21, 2014

(54) METHOD AND APPARATUS TO SUPPORT BOOTING DESPITE DEFICIENT RESOURCES

(75) Inventors: Lechong Chen, Shanghai (CN); Ma Xiang, Shanghai (CN)

(73) Assignee: Intel Corporation

( * ) Notice: Subject to any disclaimer, the term of this patent is extended or adjusted under 35 U.S.C. 154(b) by 1223 days.

This patent is subject to a terminal disclaimer.

(21) Appl. No.: 12/315,040

(22) Filed: Nov. 26, 2008

(65) Prior Publication Data

US 2009/0119496 A1    May 7, 2009

Related U.S. Application Data

(63) Continuation-in-part of application No. 10/587,448, filed as application No. PCT/CN2004/000220 on Mar. 18, 2004, now Pat. No. 7,461,244.

(51) Int. Cl.
*G06F 9/24*    (2006.01)
*G06F 15/177*  (2006.01)

(52) U.S. Cl.
USPC ............... 713/1; 713/2; 713/100; 710/10

(58) Field of Classification Search
CPC ... G06F 9/4401; G06F 9/4403; G06F 9/4404; G06F 9/4406; G06F 9/4408; G06F 9/4443; G06F 11/1417
USPC .................................. 713/1, 2, 100; 710/10
See application file for complete search history.

(56) References Cited

U.S. PATENT DOCUMENTS

| 5,819,107 A | 10/1998 | Lichtman et al. |
| 5,999,989 A | 12/1999 | Patel |
| 6,119,185 A | 9/2000 | Westerinen et al. |

(Continued)

FOREIGN PATENT DOCUMENTS

| CN | 1035373 A | 9/1989 |
| WO | 03003225 A1 | 1/2003 |
| WO | 2005/088463 A1 | 9/2005 |

OTHER PUBLICATIONS

International Search Report for PCT/CN2004/000220 mailed Dec. 9, 2004, 9 pages.

(Continued)

*Primary Examiner* — Kim Huynh
*Assistant Examiner* — Michael J Brown
(74) *Attorney, Agent, or Firm* — Blakely, Sokoloff, Taylor & Zafman LLP

(57) ABSTRACT

A method and related apparatuses support booting despite deficient system resources. In one embodiment, a processing system includes two or more devices in a peripheral connect interface (PCI) subsystem, as well as instructions encoded in a machine accessible medium. The instructions, when executed during a process of booting the processing system, may determine whether sufficient resources are available for the devices. The instructions may also retrieve boot information from an extended firmware interface (EFI) environment of the processing system, and may automatically identify a device as boot-critical, based on that boot information. The instructions may also identify a device to be rejected, and may automatically allocate resources for the boot-critical device but not for the rejected device, before the processing system boots the OS, if sufficient resources for the devices are not available. Other embodiments are described and claimed.

40 Claims, 3 Drawing Sheets

(56) References Cited

U.S. PATENT DOCUMENTS

| | | | |
|---|---|---|---|
| 6,145,021 | A | 11/2000 | Dawson, III et al. |
| 6,154,836 | A | 11/2000 | Dawson, III et al. |
| 6,161,151 | A | 12/2000 | Sudhakaran et al. |
| 6,708,240 | B1 | 3/2004 | Willke, II et al. |
| 6,873,333 | B1 | 3/2005 | Patel et al. |
| 2002/0103995 | A1* | 8/2002 | Owen et al. ............ 713/1 |
| 2003/0041088 | A1* | 2/2003 | Wilson et al. ........... 709/104 |
| 2004/0054839 | A1* | 3/2004 | Lee et al. ............... 710/306 |

OTHER PUBLICATIONS

Intel-Extensible Firmware Interface Specification—Version 1.10—Dec. 1, 2002.

Michael Kinney, "Solving BIOS Boot Issues with EFI", Intel Developer Update Magazine, Sep. 2000, Intel Corporation.

* cited by examiner

METHOD AND APPARATUS TO SUPPORT BOOTING DESPITE DEFICIENT RESOURCES

CROSS REFERENCE TO RELATED APPLICATIONS

This application is a Continuation-in-Part of U.S. patent application Ser. No. 10/587,448, filed Jul. 25, 2006, entitled METHOD AND APPARATUS TO SUPPORT BOOTING DESPITE DEFICIENT RESOURCES ("448"). 448 is a National Phase application of, and claims priority to, International Application No. PCT/CN2004/000220, filed Mar. 18, 2004, entitled METHOD AND APPARATUS TO SUPPORT BOOTING DESPITE DEFICIENT RESOURCES ("220"). This application claims priority to 448 and 220.

FIELD OF THE INVENTION

The present disclosure relates generally to the field of data processing, and more particularly to a method and related apparatuses to facilitate the process of booting a processing system despite resource deficiencies.

BACKGROUND

A typical enterprise server platform includes a complex peripheral connect interface (PCI) subsystem. For example, the PCI subsystem may include multiple PCI root bridges and multiple on-board PCI-to-PCI bridges. With such a complex PCI hierarchy, it is likely for the end-user or administrator to install or connect a large number of PCI add-on devices, some of which might request large amounts of platform resources, such as memory mapped input/output (I/O) for example. As a result, on a processing system such as an enterprise server, it is not unusual for the PCI devices to demand more resources than the platform can provide. Moreover, this problem is not limited to enterprise servers, but may occur in other types of data processing systems.

In a conventional processing system, when the PCI devices request more resources than the platform can provide, the processing system cannot boot to an operating system (OS). Instead, the basic input/output system (BIOS) may simply return an error and then terminate without booting an OS.

BRIEF DESCRIPTION OF THE DRAWINGS

The features and advantages of the present invention will become apparent from the appended claims and the following detailed description of one or more example embodiments, in which:

DETAILED DESCRIPTION

The present disclosure describes one or more example embodiments of methods and apparatuses which support booting a processing system despite deficient resources in the processing system.

Figure 1:
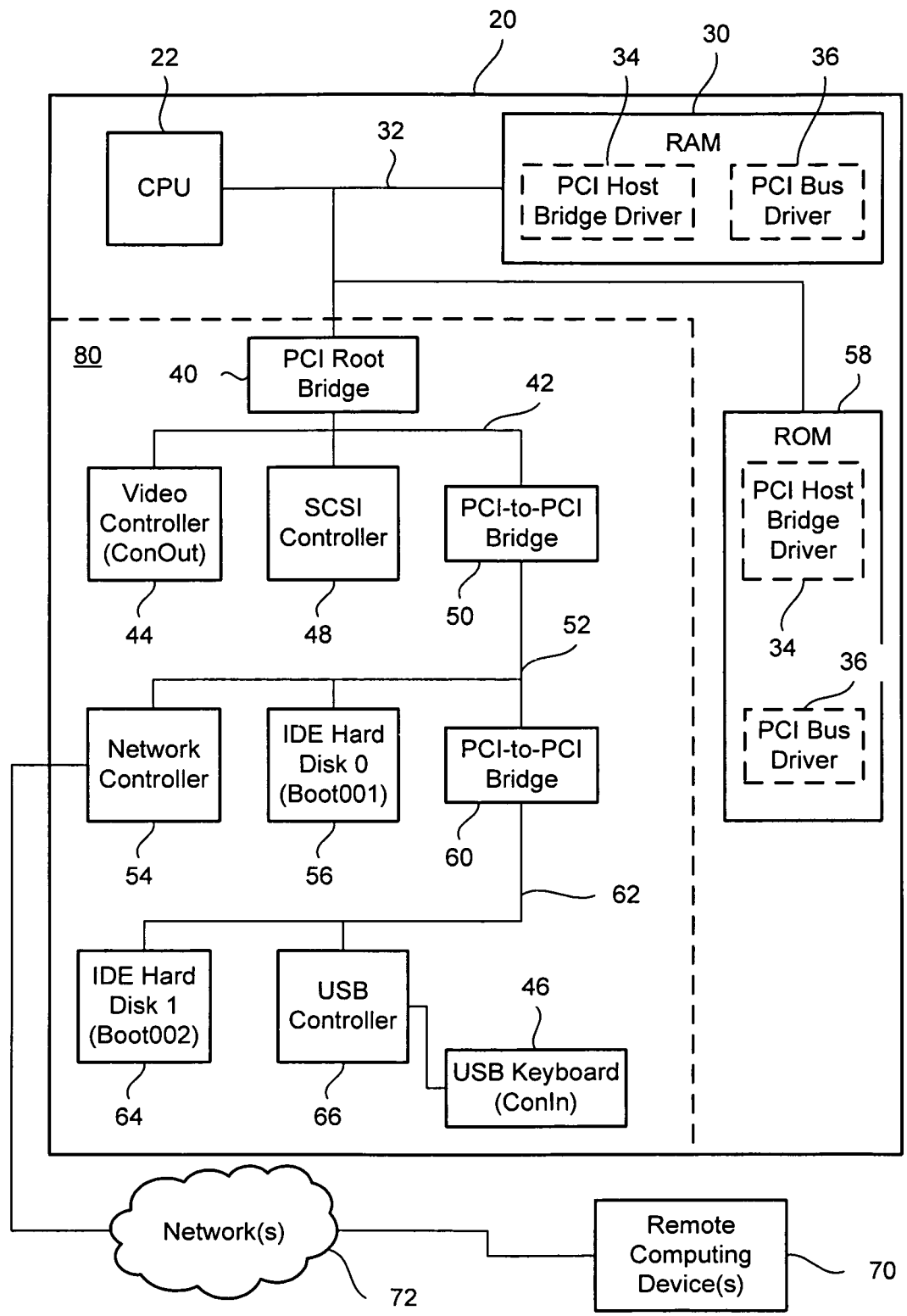
FIG. 1 is a block diagram depicting an example embodiment of a suitable data processing environment in which certain aspects of the invention may be implemented.

FIG. 1 and the following discussion are intended to provide a general description of a suitable environment in which certain aspects of the present invention may be implemented. As used herein, the terms "processing system" and "data processing system" are intended to broadly encompass a single machine, or a system of communicatively coupled machines or devices operating together. Exemplary processing systems include, without limitation, distributed computing systems, supercomputers, computing clusters, mainframe computers, mini-computers, client-server systems, personal computers, workstations, servers, portable computers, laptop computers, tablets, telephones, personal digital assistants (PDAs), handheld devices, entertainment devices such as audio and/or video devices, and other devices for processing or transmitting information.

The data processing environment of FIG. 1, for example, may include a processing system 20 that includes one or more processors or central processing units (CPUs) 22 communicatively coupled to various other components via one or more system buses 32, 42, 52, and 62, or other communication conduits. Such components may include one or more volatile or non-volatile data storage devices, such as random access memory (RAM) 30, read-only memory (ROM) 58, mass storage devices such as integrated drive electronics (IDE) hard drives 56 and 64, and/or other devices or media, such as floppy-disks, optical storage, tapes, flash memory, memory sticks, digital video disks, biological storage, etc. For purposes of this disclosure, the term "ROM" may be used in general to refer to non-volatile memory devices such as erasable programmable ROM (EPROM), electrically erasable programmable ROM (EEPROM), flash ROM, flash memory, etc.

The components coupled to processor 22 in processing system 20 may also include one or more PCI root bridges 40 and one or more PCI-to-PCI bridges 50 and 60. One or more of the above bridges may be used to connect processor 22 with hard drives 56 and 64, and with additional components, such as one or more of each of the following: a video controller 44, a small computer system interface (SCSI) controller 48, a network controller 54, a USB controller 66, and a universal serial bus (USB) keyboard 46. Some components, such as video controller 44 for example, may be implemented as adapter cards with interfaces, such as a PCI connector, for communicating with PCI bus 42.

In one embodiment, one or more devices may be implemented as embedded controllers, using components such as programmable or non-programmable logic devices or arrays, application-specific integrated circuits (ASICs), embedded computers, smart cards, and the like. For instance, PCI root bridge 40 may be implemented as an embedded device, residing on a system backplane or motherboard.

Processing system 20 may be controlled, at least in part, by input from conventional input devices, such as keyboards, mice, etc., and/or by directives received from another machine, interaction with a virtual reality (VR) environment, biometric feedback, or other input sources or signals. Processing system 20 may utilize one or more connections to one or more remote data processing systems 70, such as through network controller 54, through a modem, or through another communicative coupling. Processing systems may be interconnected by way of a physical and/or logical network 72, such as a local area network (LAN), a wide area network (WAN), an intranet, the Internet, etc. Communications involving network 72 may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

The invention may be described by reference to or in conjunction with associated data including instructions, functions, procedures, data structures, application programs, etc. which when accessed by a machine result in the machine performing tasks or defining abstract data types or low-level hardware contexts. The data may be stored in volatile and/or non-volatile data storage.

For instance, in the illustrated embodiment, ROM 58 includes one or more instruction sets to support booting processing system 20 even if processing system 20 does not include sufficient resources to meet the resource requests of all devices within processing system 20. In the example embodiment, those instructions may reside partially or completely within a PCI bus driver 36, which may communicate with other software or firmware components, such as a PCI host bridge driver 34. During platform initialization, those instructions and other software or firmware may be copied from ROM 58 to RAM 30.

A model for an interface between platform firmware and higher-level software such as operating systems was recently announced. That model is known as the Extensible Firmware Interface (EFI). Version 1.10 of the EFI Specification, dated Dec. 1, 2002, may be obtained from www.intel.com/technology/efi/main_specification.htm. The EFI specification defines a set of standard interfaces and structures to be provided by low-level platform firmware, for use in loading additional firmware and booting the OS. Platform frameworks based on the EFI model, such as the Intel® Platform Innovation Framework for EFI, are expected to supplant frameworks based on the BIOS model within the next few years as the frameworks of choice for designing, building, and operating data processing systems. The Intel® Platform Innovation Framework for EFI includes low-level firmware which provides boot and runtime service calls that are available to the operating system and its loader.

In the embodiment of FIG. 1, processing system 20 may use the Intel® Platform Innovation Framework for EFI. That framework provides distinct boot and runtime execution environments. Within the boot environment, the Intel® Platform Innovation Framework for EFI provides a class of services known as boot services. The boot services include various interfaces and protocols that provide an OS loader with access to platform capabilities required to complete OS boot. The boot services are also available to drivers and applications that need access to platform capability. However, the boot environment and thus the boot services are generally terminated once the operating system takes control of the platform. Within the runtime environment, the Intel® Platform Innovation Framework for EFI provides a class of services known as runtime services. The runtime services include interfaces that provide access to underlying platform-specific hardware that may be useful during OS runtime, such as timers. The runtime services are available during the boot process, but also persist after the OS loader terminates boot services.

Within the environment provided by the Intel® Platform Innovation Framework for EFI, each device may be uniquely identified by a device path. Also, the Intel® Platform Innovation Framework for EFI may maintain information in the pre-OS environment about devices needed or expected to be present when completing a boot process. For example, for the Intel® Platform Innovation Framework for EFI may maintain the following global variables to identify the following respective devices:

ConIn: identifies the device path of the default input console device during boot;

ConOut: identifies the device path of the default output console device during boot;

ErrOut: identifies the device path of the default console device for outputting error messages during boot; and Boot### (e.g., Boot001, Boot002, etc.): identifies the device path for a boot device.

Also, boot device selection (BDS) refers to an architectural phase within the pre-OS environment. Variables such as those listed above may be referred to as architectural boot device variables, and they may be used during BDS to determine the console devices and boot devices needed to boot an OS.

PCI host bridge driver 34 may constitute platform-specific code that exposes unique platform features to PCI bus driver 36. PCI bus driver 36 may constitute generic, platform-neutral code whose operations conform with PCI specifications. For instance, a developer may create a single PCI bus driver 36 that is capable of working with many different kinds of platforms, including without limitation simple desktop systems and complex enterprise servers.

In an example embodiment, before processing system 20 enters the BDS phase, PCI bus driver 36 may retrieve boot device information from the pre-OS environment and use that information to facilitate successful booting in a resource deficient platform, as described in greater detail below.

Figure 2:
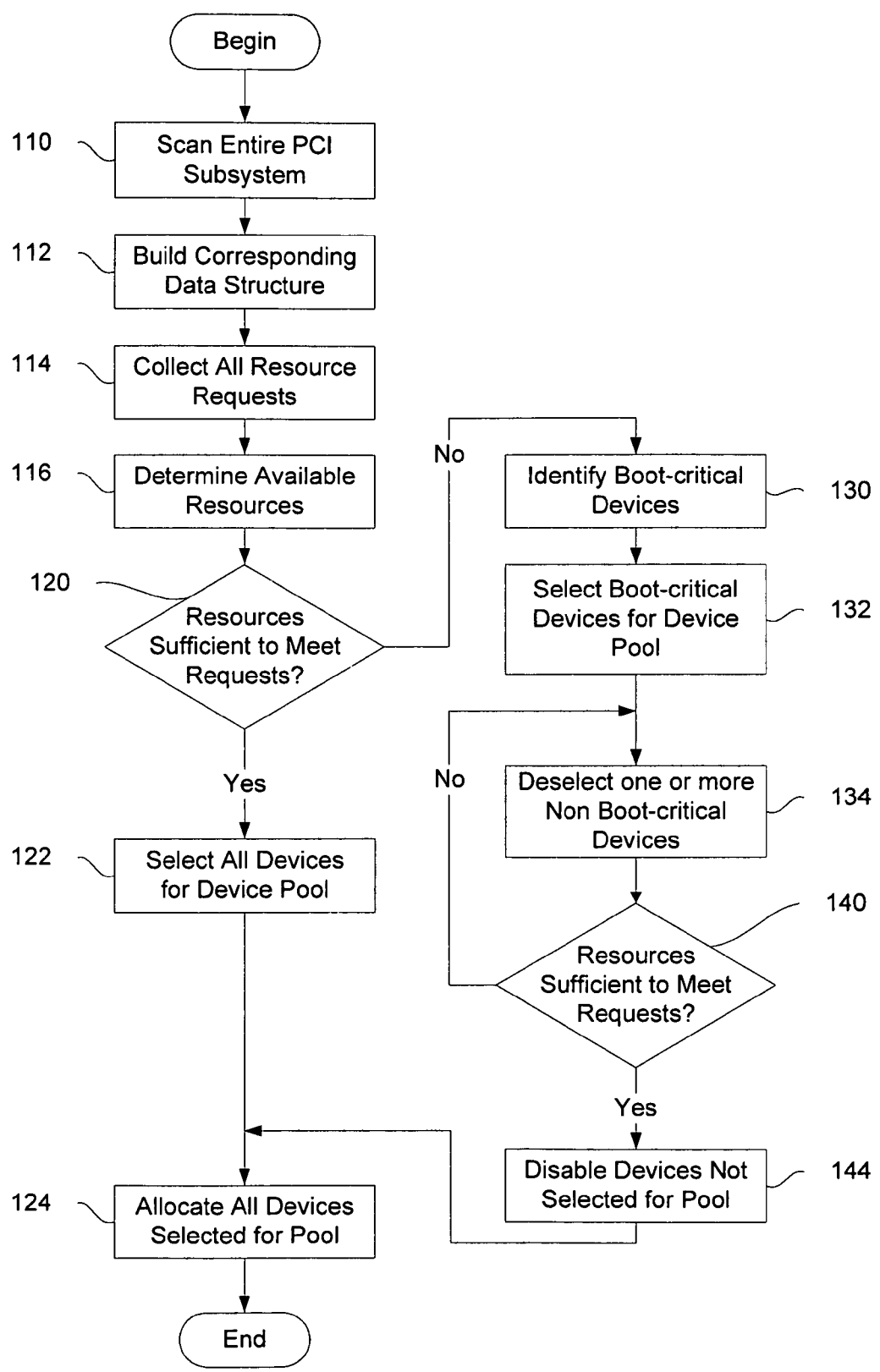
FIG. 2 is a flowchart illustrating a process to support booting despite deficient platform resources, in accordance with one embodiment of the present invention.

FIG. 2 is a flowchart illustrating a process to facilitate booting in accordance with an example embodiment of the present invention. That process is described with regard also to FIG. 1. The process of FIG. 2 may begin with processing system 20 performing boot operations in a pre-OS environment, for example in response to being powered on or reset. In the example embodiment, the process of FIG. 2 begins after processing system 20 has instantiated an EFI driver execution environment (DXE) and loaded PCI host bridge driver 34 and PCI bus driver 36.

At block 110 PCI bus driver 36 scans the entire PCI hierarchy to discover all devices in the PCI subsystem. In conjunction with scanning the PCI subsystem, PCI bus driver 36 builds a data structure, such as a PCI device tree for example, to represent and identify the discovered topology of the PCI subsystem, as indicated at block 112. Such a data structure may also be referred to as a device map. For example, in accordance with the embodiment illustrated in FIG. 1, the device map may reflect the topology of the devices residing within PCI subsystem 80.

PCI bus driver 36 may also enumerate all of the devices in PCI subsystem 80 to collect the resource requests from those devices, as shown at block 114. PCI bus driver 36 may receive various different types of resource requests, such as bus number requests, memory requests, and I/O mapping requests, for example. PCI bus driver 36 may record the resource requirements for each device in the device map.

PCI bus driver 36 may then obtain information from PCI host bridge driver 34 indicating which resources are available to be allocated to the PCI devices, as indicated at block 116. As depicted at block 120, PCI bus driver 36 may then use the resource information from PCI host bridge driver 34 and the request information from the PCI devices to determine whether processing system 20 provide the resources needed to satisfy the resource requests of the PCI devices. If processing system 20 has sufficient resources, PCI bus driver 36 may select all of the PCI devices for the device pool and may allocate the requested resources to those devices, as indicated at blocks 122 and 124.

However, if processing system 20 contains insufficient resources to meet the requests, the process may pass from block 120 to block 130, which depicts PCI bus driver 36 determining which of the PCI devices are critical to the boot process. In the example embodiment, PCI bus driver 36 identifies the boot-critical devices by retrieving boot information from the EFI DXE. For example, PCI bus driver 36 may obtain device identifiers such as device path designations from EFI BDS variables such as ConIn, ConOut, ErrOut, Boot001, Boot002, etc. PCI bus driver 36 may then select the devices identified by those device paths for inclusion in the device pool, as depicted at block 132. For instance, the device map may be updated to indicate that the boot-critical devices have been selected for the device pool.

In one embodiment, all devices identified by the ConIn, ConOut, ErrOut, and Boot### variables are selected as boot-critical devices. In addition, PCI bus driver 36 may identify certain intermediary devices, such as PCI-to-PCI bridges for example, as necessary to provide access to the boot-critical devices referenced above, based on the topology identified in the device map. PCI bus driver 36 may select those intermediate devices as boot-critical devices, as well. In alternative embodiments, different policies may be used to establish optimal or minimal resource requirements for the PCI subsystem.

PCI bus driver 36 may then finalize the list of devices to be allocated based on an appropriate allocation or rejection policy. As indicated at block 134 and 140, in the illustrated embodiment, PCI bus driver 36 may loop through a process of deselecting or rejecting one or more of the devices that were not identified as boot-critical, and then determining whether the platform provides sufficient resources for the remaining devices. PCI bus driver 36 may use the resource information from the PCI host bridge driver 34 and the request information in the device map to determine whether sufficient resources are available. According to one rejection policy, PCI bus driver 36 may deselect or reject devices in order of resource requirements, starting with the non-boot-critical device that would require the largest amount of resources. In another embodiment, the PCI bus driver may simply reject all devices not identified as boot-critical. Other policies may be used in alternative embodiments. In one embodiment, if the PCI bus driver has rejected all non-boot-critical devices and sufficient resources are still not available, the PCI bus driver may proceed to reject one or more boot-critical devices, using any appropriate rejection policy, until the remaining devices do not require more resources than the platform has available.

Once PCI bus driver 36 has identified the devices to be included in the device pool and either explicitly or implicitly deselected or rejected the remaining devices, including any appropriate intermediate devices, PCI bus driver 36 may disable all devices that weren't selected for the device pool, as shown at block 144. For instance, PCI bus driver 36 may disable rejected devices by modifying configuration settings in the configuration space of those devices, to prevent those devices from receiving and reacting to PCI bus cycles.

PCI bus driver may allocate the requested resources for the devices that were selected for the device pool, as shown at block 124. The process for coping with possible resource deficiencies may then end, and processing system 20 may continue with a boot process, for example by completing any remaining operations associated with pre-OS system configuration and then entering the BDS phase and booting an OS.

Since the rejected devices may be excluded from the device pool and disabled, they may be hidden from device drivers and invisible to the OS, and the OS may be prevented from subsequently enabling the rejected devices. Nevertheless, certain types of diagnostics and debugging may be performed on the system, as diagnostic or debugging tools may be able to scan PCI subsystem 80 and diagnose all PCI devices in a system, including the rejected devices.

Figure 3:
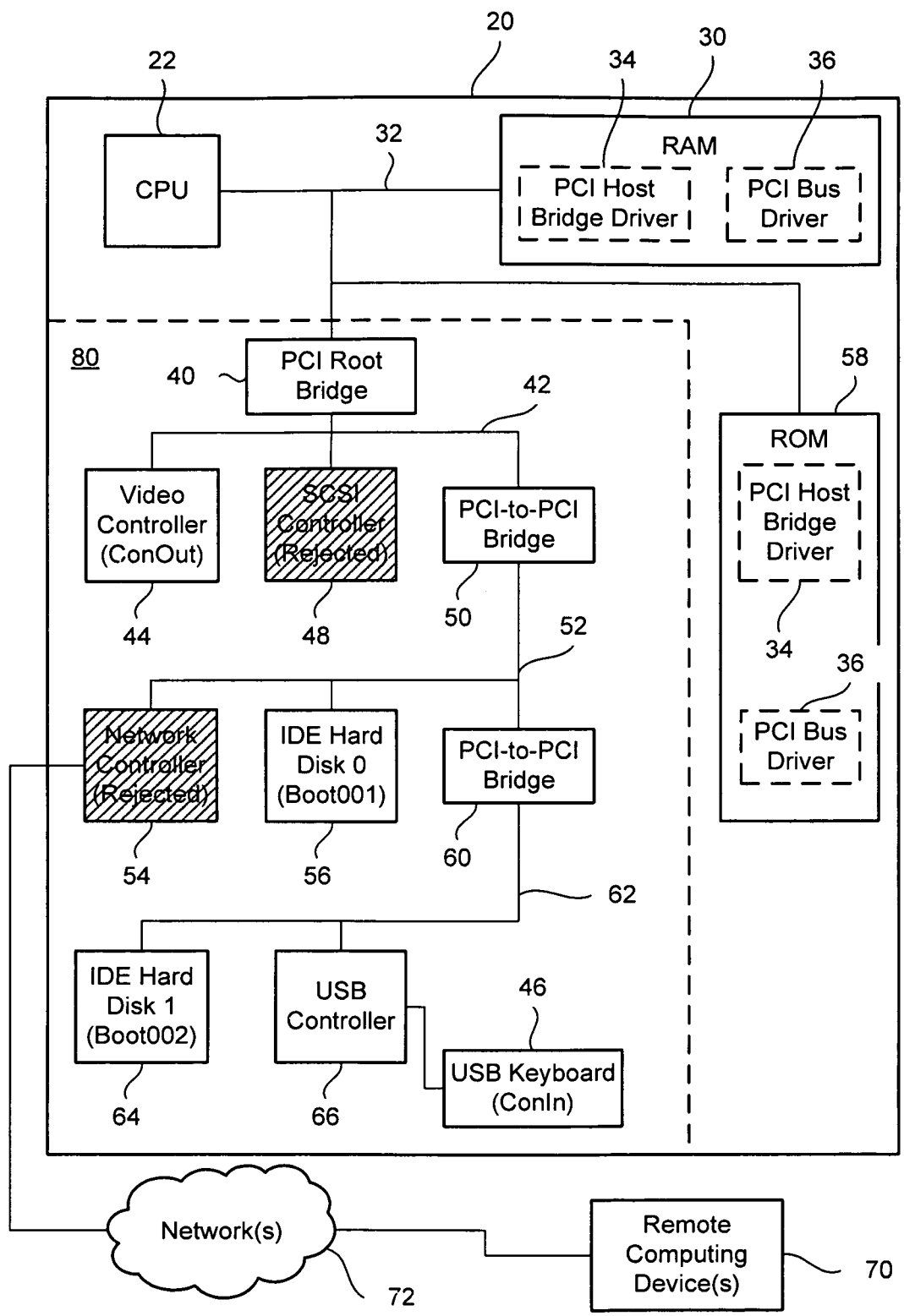
FIG. 3 is a block diagram depicting an example embodiment of the data processing environment of FIG. 1 after execution of the example process depicted in FIG. 2.

FIG. 3 is a block diagram depicting an example embodiment of the data processing environment of FIG. 1 after execution of the example process depicted in FIG. 2. As indicated by the diagonal slash marks, in an example implementation, PCI bus driver 36 may have rejected and disabled SCSI controller 48 and network controller 54. However, PCI bus driver 36 may have allocated resources for all boot-critical devices in PCI subsystem 80, including devices for ConIn, ConOut, Boot001, Boot002, and all required intermediary devices or bridges. For instance, in the illustrated embodiment, since USB keyboard 46 was designated as the ConIn device, both USB keyboard 46 and the associated USB controller 66 were identified as boot-critical devices. By contrast, in an implementation where USB keyboard 46 is not designated as the ConIn device, USB controller 66 and USB keyboard 46 may be rejected or disregarded when resources are allocated for PCI devices.

In accordance with the present disclosure, firmware or software in a processing system may identify critical and non-critical devices, allocate resources to the critical devices, and disable the non-critical devices, so that the processing system can boot to an OS despite insufficient resources to satisfy all of the devices. By contrast, when a legacy system includes more devices than the system can support, the system may be unable to boot to an operating system (OS), as described above.

In light of the principles and example embodiments described and illustrated herein, it will be recognized that the illustrated embodiments can be modified in arrangement and detail without departing from such principles. And, though the foregoing discussion has focused on particular embodiments, other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Similarly, although example processes have been described with regard to particular operations performed in a particular sequence, it will be apparent to those of ordinary skill in the art that numerous modifications to that process could be applied to derive numerous alternative embodiments of the present invention. For example, alternative embodiments may include processes that use fewer than all of the disclosed operations, processes that use additional operations, processes that use the same operations in a different sequence, and processes in which the individual operations disclosed herein are combined, subdivided, or otherwise altered.

Alternative embodiments of the invention also include machine accessible media encoding instructions for performing the operations of the invention. Such embodiments may also be referred to as program products. Such machine accessible media may include, without limitation, storage media such as floppy disks, hard disks, CD-ROMs, ROM, and RAM; as well as communications media such antennas, wires, optical fibers, microwaves, radio waves, and other electromagnetic or optical carriers. Accordingly, instructions and other data may be delivered over transmission environments or networks in the form of packets, serial data, parallel data, propagated signals, etc., and may be used in a distributed environment and stored locally and/or remotely for access by single or multi-processor machines.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein.

It should be noted, however, that the term "PCI" is not limited, for purposes of this disclosure, to the legacy PCI protocols and hardware, but also includes related protocols and hardware, such as PCI-X, PCI Express and other protocols, whether implemented before or after preparation of this disclosure. Furthermore, the invention is not limited to any particular hardware architecture, but may be practiced in association with a wide variety of architectures, including 32-bit architectures and 64-bit architectures.

In view of the wide variety of useful permutations that may be readily derived from the example embodiments described herein, this detailed description is intended to be illustrative only, and should not be taken as limiting the scope of the invention. What is claimed as the invention, therefore, is all implementations that come within the scope and spirit of the following claims and all equivalents to such implementations.

What is claimed is:

1. A method comprising:
    determining, during a process of booting a processing system, whether sufficient resources are available to meet resource requests for multiple devices associated with a peripheral connect interface (PCI) subsystem of the processing system;
    retrieving boot information from an extended firmware interface (EFI) environment of the processing system;
    automatically identifying at least one of the multiple devices as boot-critical, based on device path designations included in the boot information retrieved from the EFI environment;
    automatically determining whether the at least one boot-critical device connects via an intermediary device in the processing system;
    if the at least one boot-critical device connects via the intermediary device, automatically identifying the intermediary device as a boot critical device; and
    if sufficient resources to meet the resource requests are not available, automatically allocating resources for devices identified as boot-critical but not for all of the devices associated with the PCI subsystem, before the processing system boots an operating system (OS).

2. A method according to claim 1, further comprising:
    if sufficient resources to meet the resource requests are not available, identifying at least one device associated with the PCI subsystem as not critical to booting the processing system; and
    disabling the device identified as not critical, before the processing system boots the OS.

3. A method according to claim 1, wherein retrieving boot information from an EFI environment of the processing system comprises:
    retrieving information that designates at least one device as a device selected from a group consisting of:
    a device to serve as an input console during boot;
    a device to serve as an output console during boot; and
    a device to provide OS boot instructions.

4. A method according to claim 1, further comprising:
    discovering the devices associated with the PCI subsystem by scanning the PCI subsystem.

5. A method according to claim 1, further comprising:
    collecting resource requests from at least two of the devices associated with the PCI subsystem; and
    determining whether sufficient resources are available, based on the collected resource requests.

6. A method according to claim 1, further comprising:
    determining available resources of the processing system, based on resource information from a host bridge driver.

7. A method according to claim 6, wherein the operation of determining whether sufficient resources are available to meet the resource requests comprises:
    automatically determining whether sufficient resources are available, based on the resource information from the host bridge driver.

8. A method according to claim 1, further comprising:
    automatically identifying at least one of the devices associated with the PCI subsystem to be rejected, based on a rejection policy.

9. A method according to claim 1, further comprising:
    collecting resource requests from at least two of the devices associated with the PCI subsystem;
    determining available resources of the processing system, based on resource information from a host bridge driver;
    automatically determining whether sufficient resources are available for the devices associated with the PCI subsystem, based on the collected resource requests and the resource information from the host bridge driver; and
    disabling at least one of the devices associated with the PCI subsystem before the processing system boots the OS, if sufficient resources are not available to meet the resource requests.

10. A method according to claim 1, further comprising:
    creating a device map to describe a topology for the devices associated with the PCI subsystem before the processing system boots the OS.

11. A method according to claim 10, further comprising:
    using the device map to automatically determine whether any boot critical devices connect via any intermediary devices in the processing system.

12. A method according to claim 1, wherein:
    the operation of retrieving boot information from the EFI environment comprises retrieving device identifiers for the devices associated with the PCI subsystem; and
    the operation of automatically identifying at least one of the multiple devices as boot-critical is performed by a PCI bus driver, based on information in the PCI bus driver designating certain device identifiers as boot-critical.

13. A method according to claim 1, wherein:
    the operation of retrieving device identifiers from the EFI environment of the processing system comprises retrieving a device path designation from an EFI boot device variable; and
    the operation of automatically identifying at least one of the multiple devices as boot-critical comprises identifying the device associated with the EFI boot device variable as boot-critical.

14. An apparatus comprising:
    a processor;
    a peripheral connect interface (PCI) subsystem communicatively coupled to the processor;
    two or more devices associated with the PCI subsystem;
    a machine accessible storage medium communicatively coupled to the processor; and
    a bus driver encoded in the machine accessible storage medium, wherein the bus driver, when executed by the processor, performs operations comprising:

determining, during a process of booting the processing system, whether sufficient resources are available to meet resource requests for the two or more devices;

retrieving boot information from an extended firmware interface (EFI) environment of the processing system;

automatically identifying at least one of the devices as boot-critical, based on device path designations included in the boot information retrieved from the EFI environment;

automatically determining whether the at least one boot-critical device connects via an intermediary device in the processing system;

if the at least one boot-critical device connects via the intermediary device, automatically identifying the intermediary device as a boot critical device; and if sufficient resources to meet the resource requests are not available, facilitating successful booting of an operating system (OS) by automatically allocating resources for devices identified as boot-critical but not for all of the devices associated with the PCI subsystem, before the processing system boots the OS.

15. An apparatus according to claim 14, wherein the bus driver performs further operations, comprising:
if sufficient resources to meet the resource requests are not available, identifying at least one device associated with the PCI subsystem as not critical to booting the processing system; and
disabling the device identified as not critical, before the processing system boots the OS.

16. An apparatus according to claim 14, wherein the bus driver retrieves boot information from the EFI environment designating at least one device as a device selected from a group consisting of:
a device to serve as an input console during boot;
a device to serve as an output console during boot; and
a device to provide OS boot instructions.

17. An apparatus according to claim 14, wherein the bus driver performs further operations, comprising:
discovering the devices associated with the PCI subsystem by scanning the PCI subsystem.

18. An apparatus according to claim 14, wherein the bus driver performs further operations, comprising:
collecting resource requests from at least two of the devices associated with the PCI subsystem; and
determining whether sufficient resources are available, based on the collected resource requests.

19. An apparatus according to claim 14, wherein:
the apparatus further comprises a host bridge driver encoded in the machine accessible storage medium; and
the bus driver determines available resources of the processing system, based on resource information obtained from the host bridge driver.

20. An apparatus according to claim 19, wherein the bus driver automatically determines whether sufficient resources are available, based on the resource information obtained from the host bridge driver.

21. An apparatus according to claim 14, wherein, if sufficient resources are not available, the bus driver automatically identifies at least one of the devices associated with the PCI subsystem to be rejected, based on a rejection policy.

22. An apparatus according to claim 14, wherein:
the apparatus further comprises a host bridge driver encoded in the machine accessible storage medium; and
the operations performed by the bus driver further comprise:
collecting resource requests from at least two of the devices associated with the PCI subsystem;
determining available resources of the processing system, based on resource information from the host bridge driver;
automatically determining, based on the collected resource requests and the resource information from the host bridge driver, whether sufficient resources are available for the devices associated with the PCI subsystem; and
disabling at least one of the devices associated with the PCI subsystem, before the processing system boots the OS, if sufficient resources are not available to meet the resource requests.

23. An apparatus according to claim 14, wherein the operations to be performed by the bus driver further comprise:
creating a device map to describe a topology for the devices associated with the PCI subsystem before the processing system boots the OS.

24. An apparatus according to claim 23, wherein the operations to be performed by the bus driver further comprise:
using the device map to automatically determine whether any boot critical devices connect via any intermediary devices in the processing system.

25. An apparatus according to claim 14, wherein:
the operation of retrieving boot information from the EFI environment comprises retrieving device identifiers for the devices associated with the PCI subsystem; and
the operation of automatically identifying at least one of the multiple devices as boot-critical is performed, based on information in the PCI bus driver designating certain device identifiers as boot-critical.

26. An apparatus according to claim 14, wherein:
the operation of retrieving device identifiers from the EFI environment of the processing system comprises retrieving a device path designation from an EFI boot device variable; and
the operation of automatically identifying at least one of the multiple devices as boot-critical comprises identifying the device associated with the EFI boot device variable as boot-critical.

27. An apparatus comprising:
a machine accessible non-transitory storage medium; and
instructions encoded in the machine accessible storage medium, wherein the instructions, when executed by a processing system, cause the processing system to perform operations comprising:
determining, during a process of booting the processing system, whether sufficient resources are available to meet resource requests for two or more devices associated with a peripheral connect interface (PCI) subsystem of the processing system;
retrieving boot information from an extended firmware interface (EFI) environment of the processing system;
automatically identifying at least one of the devices as boot-critical, based on device path designations included in the boot information retrieved from the EFI environment;
automatically determining whether the at least one boot-critical device connects via an intermediary device in the processing system;
if the at least one boot-critical device connects via the intermediary device, automatically identifying the intermediary device as a boot critical device; and
if sufficient resources are not available to meet the resource requests, automatically allocating resources for boot-critical devices but not for all of the devices associated with the PCI subsystem, before the processing system boots an operating system (OS).

28. An apparatus according to claim 27, further comprising:
a bus driver encoded in the machine accessible storage medium, wherein the bus driver comprises the instructions.

29. An apparatus according to claim 27, wherein the operations performed by the instructions further comprise:
if sufficient resources to meet the resource requests are not available, identifying at least one device associated with the PCI subsystem as not critical to booting the processing system; and
disabling the device identified as not critical, before the processing system boots the OS.

30. An apparatus according to claim 27, wherein retrieving boot information from an EFI environment of the processing system comprises:
retrieving information that designates at least one device as a device selected from a group consisting of:
a device to serve as an input console during boot;
a device to serve as an output console during boot; and
a device to provide OS boot instructions.

31. An apparatus according to claim 27, wherein the operations performed by the instructions further comprise:
discovering the devices associated with the PCI subsystem by scanning the PCI subsystem.

32. An apparatus according to claim 27, wherein the operations performed by the instructions further comprise:
collecting resource requests from at least two of the devices associated with the PCI subsystem; and
determining whether sufficient resources are available, based on the collected resource requests.

33. An apparatus according to claim 27, wherein the operations performed by the instructions further comprise:
determining available resources of the processing system, based on resource information from a host bridge driver.

34. An apparatus according to claim 33, wherein the operation of determining whether sufficient resources are available comprises:
automatically determining whether sufficient resources are available, based on the resource information from the host bridge driver.

35. An apparatus according to claim 27, wherein:
if sufficient resources are not available, the instructions automatically identify at least one of the devices associated with the PCI subsystem to be rejected, based on a rejection policy.

36. An apparatus according to claim 27, wherein the operations performed by the instructions further comprise:
collecting resource requests from at least two of the devices associated with the PCI subsystem;
determining available resources of the processing system, based on resource information from a host bridge driver;
automatically determining, based on the collected resource requests and the resource information from the host bridge driver, whether sufficient resources are available for the devices associated with the PCI subsystem; and
disabling at least one of the devices associated with the PCI subsystem, before the processing system boots the OS, if sufficient resources are not available to meet the resource requests.

37. An apparatus according to claim 27, wherein the operations further comprise:
creating a device map to describe a topology for the devices associated with the PCI subsystem before the processing system boots the OS.

38. An apparatus according to claim 37, wherein the operations further comprise:
using the device map to automatically determine whether any boot critical devices connect via any intermediary devices in the processing system.

39. An apparatus according to claim 27, wherein:
the operation of retrieving boot information from the EFI environment comprises retrieving device identifiers for the devices associated with the PCI subsystem; and
the operation of automatically identifying at least one of the multiple devices as boot-critical is performed, based on information in the PCI bus driver designating certain device identifiers as boot-critical.

40. An apparatus according to claim 27, wherein:
the operation of retrieving device identifiers from the EFI environment of the processing system comprises retrieving a device path designation from an EFI boot device variable; and
the operation of automatically identifying at least one of the multiple devices as boot-critical comprises identifying the device associated with the EFI boot device variable as boot-critical.

* * * * *